United States Patent
Dhawan et al.

(10) Patent No.: US 7,858,176 B2
(45) Date of Patent: *Dec. 28, 2010

(54) MULTILAYER ARTICLES HAVING SPECIAL VISUAL EFFECTS

(75) Inventors: Sandeep Dhawan, Vienna, WV (US); Douglas W. Howie, Jr., Parkersburg, WV (US)

(73) Assignee: SABIC Innovative Plastics IP B.V. (NL)

( * ) Notice: Subject to any disclaimer, the term of this patent is extended or adjusted under 35 U.S.C. 154(b) by 338 days.

This patent is subject to a terminal disclaimer.

(21) Appl. No.: 12/191,562

(22) Filed: Aug. 14, 2008

(65) Prior Publication Data

US 2008/0305323 A1 Dec. 11, 2008

Related U.S. Application Data

(63) Continuation of application No. 11/111,560, filed on Apr. 21, 2005, now Pat. No. 7,413,624.

(51) Int. Cl.
*B32B 27/08* (2006.01)
*B32B 27/20* (2006.01)
*B32B 27/30* (2006.01)

(52) U.S. Cl. .................. 428/324; 428/325; 428/326; 428/327; 428/328; 428/337; 428/522

(58) Field of Classification Search ................ None
See application file for complete search history.

(56) References Cited

U.S. PATENT DOCUMENTS

| 3,944,631 | A | 3/1976 | Yu et al. |
| 5,962,587 | A | 10/1999 | Gaggar et al. |
| 2003/0008164 | A1 | 1/2003 | Klepsch |

FOREIGN PATENT DOCUMENTS

EP   0991724 B1   3/2003

OTHER PUBLICATIONS

U.S. Appl. No. 08/962,458, filed Oct. 31, 1997.
U.S. Appl. No. 10/748,394, filed Dec. 30, 2003.
U.S. Appl. No. 10/837,865, filed May 3, 2004.
U.S. Appl. No. 10/869,134, filed Jun. 16, 2004.

*Primary Examiner*—Richard Crispino
*Assistant Examiner*—Barbara J. Musser

(57) ABSTRACT

The present invention relates to a multilayer article, wherein said multilayer article comprises: (i) a first layer comprising an acrylic resin; (ii) at least one translucent second layer comprising (a) an acrylic resin, optionally further comprising an impact modifier; (b) a rubber modified thermoplastic resin composition; (c) optionally a rheology modifier; and (d) a visual effects additive; (iii) a third layer comprising an acrylonitrile-butadiene-styrene (ABS) resin; and (iv) an optional backing layer comprising either a thermosetting polymer substrate, optionally fiber-reinforced, or glass filled ABS resin.

33 Claims, No Drawings

MULTILAYER ARTICLES HAVING SPECIAL VISUAL EFFECTS

CROSS-REFERENCE TO RELATED APPLICATIONS

This application is a continuation application of application Ser. No. 11/111,560, filed Apr. 21, 2005 now U.S. Pat. No. 7,413,624, which is incorporated herein by reference.

BACKGROUND

The present invention relates to multilayer articles having special visual effects. Articles having special visual effect properties such as a granite or stone-like appearance are continually in demand for commercial applications. Such visual effects may often be introduced into a thermoplastic article by including special visual effects additives in one or more layers of a multilayer article. However, the magnitude of the special visual effect depends upon such factors as the surrounding thermoplastic matrix and the level of volatiles in said matrix, and may require excessive loading of visual effects additives to achieve a suitable effect. Multilayer articles having special visual effects balanced with adequate mechanical performance continue to be sought.

BRIEF DESCRIPTION

The present inventors have discovered a multilayer article, wherein said multilayer article comprises in sequence:

(i) a first layer comprising an acrylic resin having a thickness in a range of between about 0.007 millimeters and about 3 millimeters;

(ii) at least one translucent second layer having a thickness in a range of between about 0.5 millimeters and about 5 millimeters and comprising (a) an acrylic resin present in an amount in a range of between about 95 parts per hundred parts resin (phr) and about 50 phr, and optionally further comprising an impact modifier; (b) a rubber modified thermoplastic resin composition present in an amount in a range of between about 5 phr and about 50 phr and comprising a discontinuous elastomeric phase dispersed in a rigid thermoplastic phase, wherein at least a portion of the rigid thermoplastic phase is grafted to the elastomeric phase, wherein said thermoplastic phase comprises structural units derived from at least one vinyl aromatic monomer and at least one monoethylenically unsaturated nitrile monomer; (c) optionally a rheology modifier present in an amount in a range of between 0 phr and about 5 phr; and (d) a visual effects additive present in an amount in a range of between about 1 weight % and about 65 weight % and selected from the group consisting of pigments, glass-based pigments, fillers, mineral flakes, mineral fibers, mica, aluminum flakes, cellulosic flakes, cellulosic fibers, and crosslinked resinous particles having particle size in the range of 0.15 to 3 millimeters, wherein phr values are based on the resinous components of the second layer and wherein weight % values are based on the weight of the entire second layer;

(iii) a third layer comprising an acrylonitrile-butadiene-styrene (ABS) resin, said layer having an impact resistance greater than 350 Newtons per meter according to ASTM D256, and having a thickness either in a range of between about 2 millimeters and about 3.8 millimeters or in a range of between about 3.8 millimeters and about 12 millimeters; and (iv) an optional backing layer comprising a thermosetting polymer substrate or glass filled ABS resin, optionally fiber-reinforced and having a modulus of at least 1000 MPa according to ISO 178. Various other features, aspects, and advantages of the present invention will become more apparent with reference to the following description and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise. "Special visual effects" in the present context refer to a granite-like or stone-like effect or to both, when exhibited by articles formed from compositions by methods of the invention.

The term "alkyl" as used in the various embodiments of the present invention is intended to designate linear alkyl, branched alkyl, aralkyl, cycloalkyl, bicycloalkyl, tricycloalkyl and polycycloalkyl radicals comprising carbon and hydrogen atoms, and optionally comprising atoms in addition to carbon and hydrogen, for example atoms selected from Groups 15, 16 and 17 of the Periodic Table. Alkyl groups may be saturated or unsaturated, and may comprise, for example, vinyl or allyl. The term "alkyl" also encompasses that alkyl portion of alkoxide groups. In various embodiments normal and branched alkyl radicals are those comprising from 1 to about 32 carbon atoms, and include as illustrative non-limiting examples $C_1$-$C_{32}$ alkyl (optionally substituted with one or more groups selected from $C_1$-$C_{32}$ alkyl, $C_3$-$C_{15}$ cycloalkyl or aryl); and $C_3$-$C_{15}$ cycloalkyl optionally substituted with one or more groups selected from $C_1$-$C_{32}$ alkyl or aryl. Some illustrative, non-limiting examples include methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some particular illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals comprise those comprising from 7 to about 14 carbon atoms; these include, but are not limited to, benzyl, phenylbutyl, phenylpropyl, and phenylethyl. The term "aryl" as used in the various embodiments of the present invention is intended to designate substituted or unsubstituted aryl radicals comprising from 6 to 20 ring carbon atoms. Some illustrative non-limiting examples of aryl radicals include $C_6$-$C_{20}$ aryl optionally substituted with one or more groups selected from $C_1$-$C_{32}$ alkyl, $C_3$-$C_{15}$ cycloalkyl, aryl, and functional groups comprising atoms selected from Groups 15, 16 and 17 of the Periodic Table. Some particular illustrative, non-limiting examples of aryl radicals include substituted or unsubstituted phenyl, biphenyl, tolyl, xylyl, naphthyl and binaphthyl.

In various embodiments multilayer articles of the invention comprise a first layer which is the top layer. Said first layer comprises an acrylic resin which is substantially transparent to visible light. The first layer may optionally comprise at least one UV absorption agent. In a particular embodiment the acrylic resin comprises a poly(methyl methacrylate) resin. Said first layer has a thickness in one embodiment in a range of between about 0.007 millimeters and about 3 millimeters; and in another embodiment in a range of between about 0.025 millimeters and about 0.25 millimeters.

The second layer of the multilayer article is a translucent layer having a thickness in one embodiment in a range of between about 0.5 millimeters and about 5 millimeters and in another embodiment in a range of between about 0.25 millimeters and about 1 millimeter. In some particular embodiments the second layer has an average light penetration depth of about 0.13 millimeters to about 3.8 millimeters for light of wavelength 400-700 nanometers. The light penetration depth is the distance light travels before the radiant power decreases to a value of 1/e of its incident power. Light penetration depth may be measured in one embodiment by measuring the amount of light transmitted through a sample of known thickness, for example using a spectrophotometer, and then calculating the attenuation coefficient. The light penetration depth value is then the reciprocal of the attenuation coefficient.

The second layer comprises as one component an acrylic resin present in one embodiment in an amount in a range of between about 95 phr and about 50 phr, and in another embodiment in an amount in a range of between about 80 phr and about 60 phr, wherein phr values are based on the resinous components of the second layer. Suitable acrylic resins comprise those with structural units derived from methyl methacrylate. Suitable acrylic resins optionally comprise those which are impact modified, such as, but not limited to, an impact modified poly(methyl methacrylate). The amount of optional impact modifier which may be present in the acrylic resin component is in one embodiment in a range of between 0% and about 75%, in another embodiment in a range of between 30% and about 70%, and in still another embodiment in a range of between 40% and about 55%, based on the total weight of the acrylic resin and impact modifier. Suitable impact modifiers comprise acrylate-grafted poly(butyl acrylate), illustrative examples of which include methyl methacrylate-grafted poly(butyl acrylate).

The second layer further comprises as a second component a rubber modified thermoplastic resin composition present in an amount in a range of between about 5 phr and about 50 phr, based on the resinous components in the second layer. The rubber modified thermoplastic resin composition comprises a discontinuous elastomeric phase dispersed in a rigid thermoplastic phase, wherein at least a portion of the rigid thermoplastic phase is grafted to the elastomeric phase, wherein said thermoplastic phase comprises structural units derived from at least one vinyl aromatic monomer and at least one monoethylenically unsaturated nitrile monomer. The discontinuous elastomeric phase comprises a rubber substrate to which at least a portion of the rigid thermoplastic phase is grafted. There is no particular limitation on the rubber substrate provided it is susceptible to grafting by at least a portion of a graftable monomer. The rubber substrate typically has a glass transition temperature, Tg, in one embodiment less than or equal to 25° C., in another embodiment below about 0° C., in another embodiment below about minus 20° C., and in still another embodiment below about minus 30° C. As referred to herein, the $T_g$ of a polymer is the $T_g$ value of polymer as measured by differential scanning calorimetry (DSC; heating rate 20° C./minute, with the $T_g$ value being determined at the inflection point).

In one embodiment the rubber substrate is derived from polymerization by known methods of at least one monoethylenically unsaturated alkyl (meth)acrylate monomer selected from $(C_1-C_{12})$alkyl(meth)acrylate monomers and mixtures comprising at least one of said monomers. As used herein, the terminology "monoethylenically unsaturated" means having a single site of ethylenic unsaturation per molecule, and the terminology "(meth)acrylate monomers" refers collectively to acrylate monomers and methacrylate monomers. As used herein, the terminology "$(C_x-C_y)$", as applied to a particular unit, such as, for example, a chemical compound or a chemical substituent group, means having a carbon atom content of from "x" carbon atoms to "y" carbon atoms per such unit. For example, "$(C_1-C_{12})$alkyl" means a straight chain, branched or cyclic alkyl substituent group having from 1 to 12 carbon atoms per group. Suitable $(C_1-C_{12})$alkyl(meth)acrylate monomers include, but are not limited to, $(C_1-C_{12})$alkyl acrylate monomers, illustrative examples of which comprise ethyl acrylate, butyl acrylate, iso-pentyl acrylate, n-hexyl acrylate, and 2-ethyl hexyl acrylate; and their $(C_1-C_{12})$alkyl methacrylate analogs illustrative examples of which comprise methyl methacrylate, ethyl methacrylate, propyl methacrylate, iso-propyl methacrylate, butyl methacrylate, hexyl methacrylate, and decyl methacrylate. In a particular embodiment of the present invention the rubber substrate comprises structural units derived from methyl acrylate, ethyl acrylate, or n-butyl acrylate.

In various embodiments the rubber substrate may also comprise a minor amount, for example up to about 5 wt. %, of structural units derived from at least one polyethylenically unsaturated monomer, for example those that are copolymerizable with a monomer used to prepare the rubber substrate. As used herein, the terminology "polyethylenically unsaturated" means having two or more sites of ethylenic unsaturation per molecule. A polyethylenically unsaturated monomer is often employed to provide cross-linking of the rubber particles and/or to provide "graftlinking" sites in the rubber substrate for subsequent reaction with grafting monomers. Suitable polyethylenic unsaturated monomers include, but are not limited to, butylene diacrylate, divinyl benzene, butene diol dimethacrylate, trimethylolpropane tri(meth)acrylate, allyl methacrylate, diallyl methacrylate, diallyl maleate, diallyl fumarate, diallyl phthalate, triallyl methacrylate, triallylcyanurate, triallylisocyanurate, the acrylate of tricyclodecenylalcohol and mixtures comprising at least one of such monomers. In a particular embodiment the rubber substrate comprises structural units derived from triallylcyanurate.

In some embodiments the rubber substrate may optionally comprise structural units derived from minor amounts of other unsaturated monomers, for example those that are copolymerizable with a monomer used to prepare the rubber substrate. In particular embodiments the rubber substrate may optionally include up to about 25 percent by weight ("wt. %") of structural units derived from one or more monomers selected from (meth)acrylate monomers, vinyl aromatic monomers and monoethylenically unsaturated nitrile monomers. Suitable copolymerizable (meth)acrylate monomers include, but are not limited to, $C_1-C_{12}$ aryl or haloaryl substituted acrylate, $C_1-C_{12}$ aryl or haloaryl substituted methacrylate, or mixtures thereof, monoethylenically unsaturated carboxylic acids, such as, for example, acrylic acid, methacrylic acid and itaconic acid; glycidyl (meth)acrylate, hydroxy alkyl (meth)acrylate, hydroxy($C_1-C_{12}$)alkyl (meth)acrylate, such as, for example, hydroxyethyl methacrylate; ($C_4-C_{12}$)cycloalkyl (meth)acrylate monomers, such as, for example, cyclohexyl methacrylate; (meth)acrylamide monomers, such as, for example, acrylamide, methacrylamide and N-substituted-acrylamide or N-substituted-methacrylamides; maleimide monomers, such as, for example, maleimide, N-alkyl maleimides, N-aryl maleimides and haloaryl substituted maleimides; maleic anhydride; vinyl methyl ether, vinyl esters, such as, for example, vinyl acetate and vinyl propionate. As used herein, the term "(meth)acrylamide" refers collectively to acrylamides and methacrylamides. Suitable vinyl aromatic monomers include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, vinyl toluene, alpha-methyl vinyltoluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene, as well as mixtures of vinyl aromatic monomers and monoethylenically unsaturated nitrile monomers such as, for example, acrylonitrile, ethacrylonitrile, methacrylonitrile, alpha-bromoacrylonitrile and alpha-chloro acrylonitrile. Substituted styrenes with mixtures of substituents on the aromatic ring are also suitable. As used herein, the term "monoethylenically unsaturated nitrile monomer" means an acyclic compound that includes a single nitrile group and a single site of ethylenic unsaturation per molecule and includes, but is not limited to, acrylonitrile, methacrylonitrile, alpha-chloro acrylonitrile, and the like.

In a particular embodiment the rubber substrate comprises from 40 to 95 wt. % repeating units derived from one or more $(C_1-C_{12})$alkyl acrylate monomers, more preferably from one or more monomers selected from ethyl acrylate, butyl acrylate and n-hexyl acrylate.

The rubber substrate may be present in the rubber modified thermoplastic resin portion of the compositions of the invention in one embodiment at a level of from about 4 wt. % to about 94 wt. %; in another embodiment at a level of from about 10 wt. % to about 80 wt. %; in another embodiment at a level of from about 15 wt. % to about 80 wt. %; in another embodiment at a level of from about 35 wt. % to about 80 wt. %; in another embodiment at a level of from about 40 wt. % to about 80 wt. %; in another embodiment at a level of from about 25 wt. % to about 60 wt. %, and in still another embodiment at a level of from about 40 wt. % to about 50 wt. %, based on the weight of the rubber modified thermoplastic resin. In other embodiments the rubber substrate may be present in compositions of the invention at a level of from about 5 wt. % to about 50 wt. %; at a level of from about 8 wt. % to about 40 wt. %; or at a level of from about 10 wt. % to about 30 wt. %, based on the weight of the rubber modified thermoplastic resin.

There is no particular limitation on the particle size distribution of the rubber substrate (sometimes referred to hereinafter as initial rubber substrate to distinguish it from the rubber substrate following grafting). In some embodiments the initial rubber substrate may possess a broad particle size distribution with particles ranging in size from about 50 nm to about 1000 nm. In other embodiments the mean particle size of the initial rubber substrate may be less than about 100 nm. In still other embodiments the mean particle size of the initial rubber substrate may be in a range of between about 80 nm and about 500 nm. In still other embodiments the mean particle size of the initial rubber substrate may be in a range of between about 200 nm and about 750 nm. In other embodiments the mean particle size of the initial rubber substrate may be greater than about 400 nm. In still other embodiments the initial rubber substrate comprises particles which are a mixture of particle sizes with at least two mean particle size distributions. In a particular embodiment the initial rubber substrate comprises particles which are a mixture of particle sizes with two mean particle size distributions each in a range of between about 80 nm and about 500 nm.

The rubber substrate may be made according to known methods. In one embodiment the rubber substrate is made by aqueous emulsion polymerization in the presence of a free radical initiator, e.g., an azonitrile initiator, an organic peroxide initiator, a persulfate initiator or a redox initiator system, and, optionally, in the presence of a chain transfer agent, e.g., an alkyl mercaptan and coagulated to form particles of rubber substrate.

The rigid thermoplastic resin phase of the rubber modified thermoplastic resin comprises one or more thermoplastic polymers. In one embodiment of the present invention monomers are polymerized in the presence of the rubber substrate to thereby form a rigid thermoplastic phase, at least a portion of which is chemically grafted to the elastomeric phase. The portion of the rigid thermoplastic phase chemically grafted to rubber substrate is sometimes referred to hereinafter as grafted copolymer. The rigid thermoplastic phase comprises a thermoplastic polymer or copolymer that exhibits a glass transition temperature (Tg) in one embodiment of greater than about 25° C., in another embodiment of greater than or equal to 90° C., and in still another embodiment of greater than or equal to 100° C.

In a particular embodiment the rigid thermoplastic phase comprises a polymer having structural units derived from one or more monomers selected from the group consisting of vinyl aromatic monomers and monoethylenically unsaturated nitrile monomers. Suitable vinyl aromatic polymers comprise at least about 20 wt. % structural units derived from one or more vinyl aromatic monomers. In one embodiment the rigid thermoplastic phase comprises a vinyl aromatic polymer having first structural units derived from one or more vinyl aromatic monomers and having second structural units derived from one or more monoethylenically unsaturated nitrile monomers. Examples of such vinyl aromatic polymers include, but are not limited to, styrene/acrylonitrile copolymers, alpha-methylstyrene/acrylonitrile copolymers, or alpha-methylstyrene/styrene/acrylonitrile copolymers. In another particular embodiment the rigid thermoplastic phase comprises a vinyl aromatic polymer having first structural units derived from one or more vinyl aromatic monomers; second structural units derived from one or more monoethylenically unsaturated nitrile monomers; and third structural units derived from one or more monomers selected from the group consisting of $(C_1-C_{12})$alkyl- and aryl-(meth)acrylate monomers. Examples of such vinyl aromatic polymers include, but are not limited to, styrene/acrylonitrile/methyl methacrylate copolymers, alpha-methylstyrene/acrylonitrile/methyl methacrylate copolymers and alpha-methylstyrene/styrene/acrylonitrile/methyl methacrylate copolymers. Further examples of suitable vinyl aromatic polymers comprise styrene/methylmethacrylate copolymers, styrene/maleic anhydride copolymers; styrene/acrylonitrile/maleic anhydride copolymers, and styrene/acrylonitrile/acrylic acid copolymers. These copolymers may be used for the rigid thermoplastic phase either individually or as mixtures.

When structural units in copolymers are derived from one or more monoethylenically unsaturated nitrile monomers, then the amount of nitrile monomer added to form the copolymer comprising the grafted copolymer and the rigid thermoplastic phase may be in one embodiment in a range of between about 5 wt. % and about 40 wt. %, in another embodiment in a range of between about 5 wt. % and about 30 wt. %, in another embodiment in a range of between about 10 wt. % and about 30 wt. %, and in yet another embodiment in a range of between about 15 wt. % and about 30 wt. %, based on the total weight of monomers added to form the copolymer comprising the grafted copolymer and the rigid thermoplastic phase.

In some particular embodiments the wt./wt. ratio of vinyl aromatic monomer to monoethylenically unsaturated nitrile monomer is in one embodiment in a range of between about 1:1 and about 6:1, in another embodiment in a range of between about 1.5: 1 and about 4:1, in still another embodiment in a range of between about 2:1 and about 3:1, and in still another embodiment in a range of between about 2.5:1 and about 3:1.

When structural units in copolymers are derived from one or more ($C_1$-$C_{12}$)alkyl- and aryl-(meth)acrylate monomers, then the amount of the said monomer added to form the copolymer comprising the grafted copolymer and the rigid thermoplastic phase may be in one embodiment in a range of between about 5 wt. % and about 50 wt. %, in another embodiment in a range of between about 5 wt. % and about 45 wt. %, in another embodiment in a range of between about 10 wt. % and about 35 wt. %, and in yet another embodiment in a range of between about 15 wt. % and about 35 wt. %, based on the total weight of monomers added to form the copolymer comprising the grafted copolymer and the rigid thermoplastic phase.

The amount of grafting that takes place between the rubber substrate and monomers comprising the rigid thermoplastic phase varies with the relative amount and composition of the rubber phase. In one embodiment, greater than about 10 wt. % of the rigid thermoplastic phase is chemically grafted to the rubber, based on the total amount of rigid thermoplastic phase in the rubber modified thermoplastic resin. In another embodiment, greater than about 15 wt. % of the rigid thermoplastic phase is chemically grafted to the rubber, based on the total amount of rigid thermoplastic phase in the rubber modified thermoplastic resin. In still another embodiment, greater than about 20 wt. % of the rigid thermoplastic phase is chemically grafted to the rubber, based on the total amount of rigid thermoplastic phase in the rubber modified thermoplastic resin. In particular embodiments the amount of rigid thermoplastic phase chemically grafted to the rubber may be in a range of between about 5 wt. % and about 90 wt. %; between about 10 wt. % and about 90 wt. %; between about 15 wt. % and about 85 wt. %; between about 15 wt. % and about 50 wt. %; or between about 20 wt. % and about 50 wt. %, based on the total amount of rigid thermoplastic phase in the rubber modified thermoplastic resin. In yet other embodiments, about 40 wt. % to 90 wt. % of the rigid thermoplastic phase is free, that is, non-grafted.

The rigid thermoplastic phase may be present in the rubber modified thermoplastic resin in one embodiment at a level of from about 85 wt. % to about 6 wt. %; in another embodiment at a level of from about 65 wt. % to about 6 wt. %; in another embodiment at a level of from about 60 wt. % to about 20 wt. %; in another embodiment at a level of from about 75 wt. % to about 40 wt. %, and in still another embodiment at a level of from about 60 wt. % to about 50 wt. %, based on the total weight of the rubber modified thermoplastic resin. In other embodiments rigid thermoplastic phase may be present in a range of between about 90 wt. % and about 30 wt. %, based on the total weight of the rubber modified thermoplastic resin.

The rigid thermoplastic phase may be formed solely by polymerization carried out in the presence of rubber substrate, or by addition of one or more separately synthesized rigid thermoplastic polymers to the rubber modified thermoplastic resin, or by a combination of both processes. In some embodiments the separately synthesized rigid thermoplastic polymer comprises structural units essentially identical to those of the rigid thermoplastic phase comprising the rubber modified thermoplastic resin. In some particular embodiments separately synthesized rigid thermoplastic polymer comprises at least one of styrene-acrylonitrile copolymer or styrene-acrylonitrile-methyl methacrylate copolymer. When at least a portion of separately synthesized rigid thermoplastic polymer is added to the rubber modified thermoplastic resin, then the amount of said separately synthesized rigid thermoplastic polymer added is in an amount in a range of between about 5 wt. % and about 80 wt. % based on the weight of the rubber modified thermoplastic resin.

The rigid thermoplastic phase may be made according to known processes, for example, mass polymerization, emulsion polymerization, suspension polymerization or combinations thereof, wherein at least a portion of the rigid thermoplastic phase is chemically bonded, i.e., "grafted" to the rubber phase via reaction with unsaturated sites present in the rubber phase. The grafting reaction may be performed in a batch, continuous or semi-continuous process. Representative procedures include, but are not limited to, those taught in U.S. Pat. No. 3,944,631; and U.S. patent application Ser. No. 08/962,458, filed Oct. 31, 1997. The unsaturated sites in the rubber phase are provided, for example, by unsaturated sites in those structural units of the rubber that were derived from a graftlinking monomer.

In some embodiments of the present invention monomer grafting to rubber substrate with concomitant formation of rigid thermoplastic phase may optionally be performed in stages wherein at least one first monomer is grafted to rubber substrate followed by at least one second monomer different from said first monomer. Representative procedures for staged monomer grafting to rubber substrate include, but are not limited to, those taught in U.S. patent application Ser. No. 10/748,394, filed Dec. 30, 2003.

In a particular embodiment the rubber modified thermoplastic resin comprises an acrylate/styrene/acrylonitrile (ASA) resin wherein the rigid thermoplastic phase comprises either a styrene/acrylonitrile copolymer or a styrene/acrylonitrile/methyl methacrylate copolymer. An ASA resin comprising a styrene/acrylonitrile/methyl methacrylate copolymer as rigid thermoplastic phase is sometimes referred to as a methyl methacrylate-modified ASA (sometimes abbreviated MMA-ASA). In another particular embodiment the second layer comprises an ASA resin as rubber modified thermoplastic resin composition present in an amount in a range of between about 20 phr and about 40 phr, based on the resinous components in the second layer.

The second layer may optionally comprise a rheology modifier as a third component present in an amount in a range of between 0 phr and about 5 phr, based on the resinous components in the second layer. When it is present, the rheology modifier may be present in one embodiment in an amount in a range of between about 0.5 phr and about 5 phr, and in another embodiment in an amount in a range of between about 1 phr and about 3 phr, based on the resinous components in the second layer. Suitable rheology modifiers improve the melt strength of the second layer during processing. In a particular embodiment, when present, the rheology modifier is present in an amount sufficient to improve the melt strength of the second layer during processing. Melt strength may be measured by methods known to those skilled in the art. In one embodiment melt strength is measured by clamping a molded sample of the material in a frame to support its edges and allowing the sample to sag under its own weight while heated in an oven for 20 minutes at 220° C. in ambient atmosphere. After the designated time period, the sample is examined for holes or tears in comparison to corresponding samples of different composition. Illustrative rheology modifiers comprise (i) acrylic copolymer resins, such as acrylic rubber-modified acrylic resins, for example METABLEN® modifiers available from Mitsubishi Rayon Co.; (ii) resins, particularly high molecular weight resins, comprising structural units derived from styrene and acrylonitrile and optionally methyl methacrylate, for example BLENDEX® modifiers available from GE Specialty Chemicals; (iii)

fluoropolymers, such as, but not limited to, polytetrafluoroethylene, optionally encapsulated in a resin matrix, illustrative examples of which include resins comprising structural units derived from styrene and acrylonitrile and optionally methyl methacrylate as described, for example in U.S. Pat. No. 5,962,587; and (iv) like materials.

The second layer further comprises at least one special visual effects additive present in an amount in a range of between about 1 weight % and about 65 weight %, based on the weight of the entire second layer. Suitable additives comprise those which provide at least one of a color, or a metallic sparkle, a metallic luster, or a metallescent effect, an angular metamerism effect, a pearlescent effect, an appearance resembling stone or granite, or like effects. Illustrative special visual effects additives are selected from the group consisting of pigments, glass-based pigments, fillers, mineral flakes, mineral fibers, mica, aluminum flakes, cellulosic flakes, cellulosic fibers, and crosslinked resinous particles having particle size in the range of 0.15 to 3 millimeters.

In some embodiments of the invention the second layer may be present as a composite comprising at least two layers, for example sub-layers 2a and 2b. One of said sub-layers comprises the materials suitable for use in said second layer described herein above. Another of said sub-layers comprises a polymer with structural units derived from methyl methacrylate, said polymer optionally comprising a methyl methacrylate-grafted poly(butyl acrylate) impact modifier. In some embodiments sub-layer 2a is the layer in contact with the first or top layer of the multilayer article and sub-layer 2a is itself translucent with a value for light penetration depth as described herein above. Sub-layer 2b, which is in contact with both sub-layer 2a and the third layer of the multilayer article, has a lower value for light penetration depth or a different visual texture, or both. In some particular embodiments both sub-layers 2a and 2b comprise the same resinous matrix material but have different visual effects additives, for example aluminum flake in sub-layer 2a and glass fiber in sub-layer 2b. In other particular embodiments sub-layers 2a and 2b comprise different resinous matrix materials and have different visual effects additives, for example methyl methacrylate-modified ASA in either sub-layer 2a or 2b and PMMA modified with methyl methacrylate-grafted poly(butyl acrylate) rubber in the other sub-layer with a pearlescent additive in sub-layer 2a and carbon black in sub-layer 2b.

Multilayer articles of the invention comprise a third layer comprising an acrylonitrile-butadiene-styrene (ABS) resin, said layer having an impact resistance greater than 350 Newtons per meter according to ASTM D256, and having a thickness either in a range of between about 2 millimeters and about 3.8 millimeters or in a range of between about 3.8 millimeters and about 12 millimeters. The third layer may optionally comprise recycled material derived from the entirety of or from one or more layers of the multilayer article.

In some embodiments the third layer may comprise a blend of ABS with at least one other resinous material. Suitable resinous materials in this context comprise poly(vinyl chloride), polycarbonate, particular bisphenol A polycarbonate, poly(butylene terephthalate), a methyl methacrylate grafted ABS, or an ABS with structural units derived from alpha-methyl styrene in place of styrene.

Multilayer articles of the invention may optionally comprise a backing or support layer in contact with the third layer. In particular embodiments, when said backing layer is present, it comprises a thermosetting polymer substrate, optionally fiber-reinforced and having a modulus of at least 1000 megapascals (MPa) according to ISO 178. Illustrative thermosetting resins suitable for use as the optional backing layer comprise fiber-reinforced plastic (FRP) or thermosetting polyurethane. In some particular embodiments the backing layer is not present and the thickness of the third layer comprising an ABS resin is in a range of between about 3.8 millimeters to about 12 millimeters. In other particular embodiments the backing layer is not present, and the third layer is selected from the group consisting of a filled ABS, a glass-filled ABS, a high-heat ABS comprising structural units derived from alpha-methyl styrene, and an ABS blend with a polycarbonate.

Layers of multilayer articles of the present invention may optionally comprise additives known in the art including, but not limited to, stabilizers, such as, but not limited to, color stabilizers, heat stabilizers, light stabilizers, antioxidants, UV screeners, and UV absorbers. Layers of said multilayer articles may also optionally comprise additives known in the art including, but not limited to, flame retardants, anti-drip agents, lubricants, flow promoters and other processing aids; plasticizers, antistatic agents, mold release agents, impact modifiers, fillers, and colorants such as dyes and pigments which may be organic, inorganic or organometallic; and like additives. Often more than one additive is included in compositions of the invention, and in some embodiments more than one additive of one type is included. In a particular embodiment at least one of the first, second, or third layers further comprises an additive selected from the group consisting of mineral flakes, metallic flakes, colorants, dyes, pigments, lubricants, stabilizers, fillers, crosslinked resinous particles, crosslinked acrylic particles, and mixtures thereof.

Methods for making articles comprising compositions of the invention comprise at least one step of drying the components of the second layer, either individually or in combination, to a volatiles content of less than 0.06 weight % prior to processing a mixture comprising said components to form said second layer. When drying conditions are not such that the desired level of residual volatiles is achieved, then the appearance of the second layer at the interface with air or at the interface with the transparent first layer of a multilayer article in not acceptable, and shows streaking and roughness. Volatiles in the present context comprise water and any volatile organic components (VOC) which may optionally be present. In a particular embodiment the components of the second layer, either individually or in combination, are dried to a volatiles content of less than 0.03 weight % prior to processing a mixture comprising said components to form said second layer. In another particular embodiment a mixture of the components of the second layer is dried at a temperature above the glass transition temperature of the majority resinous component in said mixture. In still another particular embodiment a mixture of the components of the second layer is dried at a temperature above the glass transition temperature of the resinous component with the highest glass transition temperature in said mixture. Drying may be accomplished using methods known in the art, including, but not limited to, ovens, forced air ovens, vacuum ovens, feed hopper dryers, and like methods.

In various embodiments articles of the invention may be made by coextrusion of at least two layers. In some embodiments the components of any layer may optionally be precompounded using methods known in the art before extrusion into layers. Methods for making articles comprising compositions of the invention also comprise at least one step of coextruding the second and third layers, and optionally the first layer to form a multilayer article. In a particular embodiment the second and third layers are coextruded, and the surface of the second layer is melt-polished before application of the first layer to said surface. Methods for melt-polishing the surface of an extruded layer are known in the art and generally involve contacting a surface of an extruded layer with one or more polishing elements, which contact renders the surface of said extruded layer smooth. Application of said first layer to the composite structure comprising the second and third layers may be performed by techniques known in the art such as, but not limited to, lamination.

Articles comprising compositions of the invention may be further processed by known multilayer article processing techniques. In particular embodiments said articles may be further processed by at least one step of thermoforming, surface decoration, surface etching, painting, baking in a paint oven, in-mold decoration, embossing, or stamping.

Articles made by embodiments of the methods of the invention are also embodiments of the invention. Said articles include, but are not limited to, those typically used in applications requiring special visual effect properties. Some particular suitable articles comprise outdoor and indoor signs, and highway signs. Additional articles which can be made by the method of the present invention include, but are not limited to, articles for outdoor vehicle and device (OVAD) applications; exterior and interior components for automotive, truck, military and emergency vehicles (including automotive, and water-borne vehicles), scooter, and motorcycle, including panels, quarter panels, vertical panels, horizontal panels, trim, pillars, center posts, doors, decklids, trunklids, hoods, bonnets, roofs, fascia, pillar appliques, cladding, body side moldings, wheel covers, window frames, and license plate enclosures; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, pools; spas; hot-tubs; steps; step coverings; building and construction applications such as fencing, roofs; siding, particularly vinyl siding applications; windows, decorative window furnishings or treatments; wall panels, and doors; enclosures, housings, panels, and parts for automatic teller machines (ATM); enclosures, housings, panels, and parts for lawn and garden tractors, lawn mowers, and tools, including lawn and garden tools; window and door trim; toys; enclosures, housings, panels, and parts for recreational vehicle panels and components; playground equipment; articles made from plastic-wood combinations; golf course markers; utility pit covers; mobile phone housings; radio sender housings; radio receiver housings; light fixtures; lighting appliances; reflectors; network interface device housings; transformer housings; air conditioner housings; cladding or seating for public transportation; cladding or seating for trains, subways, or buses; meter housings; antenna housings; cladding for satellite dishes; and like applications.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

In the following examples and comparative examples the various components include: (i) poly(methyl methacrylate) (PMMA; ACRYLITE® H-12) obtained from CYRO Industries, Rockaway, N.J.; (ii) methyl methacrylate-modified acrylonitrile-styrene-acrylate resin (abbreviated MMA-ASA) obtained from General Electric Plastics, Pittsfield, Mass.; (iii) acrylic rubber-modified acrylic resin comprising structural units derived from methyl methacrylate and about 10-30 weight % butyl acrylate (METABLEN® P-552) obtained from Mitsubishi Rayon Co.; (iv) an impact modified acrylic resin comprising PMMA modified with methyl methacrylate-grafted poly(butyl acrylate) rubber) (DR-101) having a melt flow rate of 1 gram per 10 minutes measured at 230° C. using a 3.8 kilogram weight according to ASTM D1238 and a flexural modulus of 1860 MPa as measured according to ASTM D790 obtained from Atofina; (v) black granite-appearing granules (CS-3124) comprising crosslinked acrylic particles obtained from Atofina, and (vi) white granite-appearing granules (CS-3125) comprising crosslinked acrylic particles obtained from Atofina. Granite-appearing granules comprising crosslinked acrylic particles are described, for example, in European Patent Application 0991724 B1. Mean particle size was analyzed by means of multi-angle light scattering using a Coulter LS230 particle size analyzer. Values for phr are based on the resinous components of the second layer. Except as noted for relative wt. % values, all wt. % values are based on the weight of the entire composition. The designations of the layer numbers (e.g. second layer, third layer) in the following examples refer to the order of layers given herein above.

EXAMPLE 1

A composition for the second layer of a multilayer article is prepared comprising 80 phr PMMA, 20 phr methyl methacrylate-modified ASA, 2 phr of a rheology modifier consisting of an acrylic rubber-modified acrylic resin, 1 phr ethylenebisstearamide, 5 phr black granite granules, 5 phr white granite granules, and 0.002 phr carbon black. The composition also comprises 1.4 phr of various stabilizers and 0.2 phr pigments. The composition is compounded to produce pellets. The pellets are dried to a volatiles content of less than 0.03 weight % prior to coextrusion in combination with a third layer comprising ABS resin to form a two layer composite structure. The appearance of the second layer of the article is acceptable, being essentially free of streaking and roughness. An acrylic resin-comprising first layer is then applied to said composite structure to be in contact with said second layer to form a multilayer article.

COMPARATIVE EXAMPLE 1

A multilayer article comprising the composition of example 1 as second layer is produced as in example 1 except that the composition of the second layer is dried to a volatiles content higher than 0.03 weight % before coextrusion and application of the first layer to make said article. The appearance of the second layer of the article is unacceptable, showing streaking and roughness.

EXAMPLE 2

A multilayer article comprising the composition of example 1 as second layer is produced as in example 1 except that a first layer comprising an acrylic resin is coextruded together with said second and third layers to produce the multilayer article. The appearance of the second layer of the article is acceptable, being essentially free of streaking and roughness.

EXAMPLES 3-6

Compositions for the second layer of individual multilayer articles are prepared comprising the components in phr shown in Table 1. Each composition also comprises 1 phr ethylenebisstearamide, 4 phr black granite granules, 4 phr white granite granules, and 1.4 phr of various stabilizers. Each composition is compounded to produce pellets. In each case the pellets are dried to a volatiles content of less than 0.03 weight % prior to coextrusion in combination with components of a third layer comprising ABS resin to form a two layer composite structure. In each case in the coextrusion process the surface of the second layer is melt-polished. In each case the appearance of the second layer of the article is acceptable, being essentially free of streaking and roughness. In addition, when the second layer is produced using the composition of example 3, the interface of the second layer with air has a surface gloss of 27 as measured at a 20 degree angle. In each case said composite structure is then laminated with an acrylic resin-comprising first layer placed in contact with said second layer to form a multilayer article.

TABLE 1

| Component | Example 3 | Example 4 | Example 5 | Example 6 |
|---|---|---|---|---|
| PMMA | 80 | 80 | — | — |
| DR-101 | — | — | 80 | 80 |
| MMA-ASA | 20 | 20 | 20 | 20 |
| METABLEN | 2 | — | 2 | — |

COMPARATIVE EXAMPLE 2

A multilayer article comprising the composition of example 3 as second layer is produced as described in example 3 except that the composition of the second layer is dried to a volatiles content higher than 0.03 weight % before coextrusion to make said article. The appearance of the second layer of the article is unacceptable, showing streaking and roughness. In addition the interface of the second layer with air has a decreased surface gloss of 19 as measured at a 20 degree angle.

EXAMPLES 7-10

Compositions for the second layer of individual multilayer articles are prepared comprising the components shown in Table 1. Each composition also comprises 1 phr ethylenebisstearamide, 4 phr black granite granules, 4 phr white granite granules, and 1.4 phr of various stabilizers. Each composition is compounded to produce pellets. In each case the pellets are coextruded in combination with components of a third layer comprising ABS resin to form a two layer composite structure. In each case in the coextrusion process the surface of the second layer is melt-polished. In each case the appearance of the second layer of the article is acceptable, being essentially free of streaking and roughness. In each case said composite structure is then laminated with an acrylic resin-comprising first layer placed in contact with said second layer to form a multilayer article.

COMPARATIVE EXAMPLES 3-6

Compositions for the second layer of individual multilayer articles are prepared comprising the components shown in Table 1. Each composition also comprises 1 phr ethylenebisstearamide, 4 phr black granite granules, 4 phr white granite granules, and 1.4 phr of various stabilizers. Each composition is compounded to produce pellets. In each case the pellets are coextruded in combination with components of a third layer comprising ABS resin to form a two layer composite structure. In each case in the coextrusion process the surface of the second layer is not melt-polished. In each case the appearance of the second layer of the article is not acceptable, showing streaking and roughness.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and patent applications cited herein are incorporated herein by reference.

The invention claimed is:

1. A multilayer article, which comprises in sequence:
   (i) a first layer comprising an acrylic resin having a thickness in a range of between about 0.007 millimeters and about 3 millimeters;
   (ii) at least one translucent second layer having a thickness in a range of between about 0.5 millimeters and about 5 millimeters and comprising (a) an acrylic resin present in an amount in a range of between about 95 phr and about 50 phr, and optionally further comprising an impact modifier; (b) a rubber modified thermoplastic resin composition present in an amount in a range of between about 5 phr and about 50 phr and comprising a discontinuous elastomeric phase dispersed in a rigid thermoplastic phase, wherein at least a portion of the rigid thermoplastic phase is grafted to the elastomeric phase, wherein said thermoplastic phase comprises structural units derived from at least one vinyl aromatic monomer and at least one monoethylenically unsaturated nitrile monomer; (c) optionally a rheology modifier present in an amount in a range of between 0 phr and about 5 phr; and (d) a visual effects additive present in an amount in a range of between about 1 weight % and about 65 weight % and selected from the group consisting of pigments, glass-based pigments, fillers, mineral flakes, mineral fibers, mica, aluminum flakes, cellulosic flakes, cellulosic fibers, and crosslinked resinous particles having particle size in the range of 0.15 to 3 millimeters, wherein phr values are based on the resinous components of the second layer and wherein weight % values are based on the weight of the entire second layer;
   (iii) a third layer directly contacting said second layer comprising an acrylonitrile-butadiene-styrene (ABS) resin, said layer having an impact resistance greater than 350 Newtons per meter according to ASTM D256, and having a thickness either in a range of between about 2 millimeters and about 3.8 millimeters or in a range of between about 3.8 millimeters and about 12 millimeters; and
   (iv) an optional backing layer comprising either a thermosetting polymer substrate, optionally fiber-reinforced, or glass filled ABS resin, and having a modulus of at least 1000 MPa according to ISO 178.

2. The multilayer article of claim 1, wherein both the first layer and component (a) of the second layer comprise a polymer with structural units derived from methyl methacrylate.

3. The multilayer article of claim 2, wherein component (a) of the second layer further comprises a methyl methacrylate-grafted poly(butyl acrylate) impact modifier.

4. The multilayer article of claim 1, wherein the elastomeric phase of the rubber modified thermoplastic resin comprises a polymer having a glass transition temperature of less than about 25° C.

5. The multilayer article of claim 1, wherein the elastomeric phase of the rubber modified thermoplastic resin comprises a polymer having structural units derived from methyl acrylate, ethyl acrylate, or butyl acrylate.

6. The multilayer article of claim 1, wherein the elastomeric phase is present in an amount of between about 10 wt. % to about 80 wt. %, based on the weight of the rubber modified thermoplastic resin.

7. The multilayer article of claim 1, wherein the rigid thermoplastic phase comprises structural units derived from styrene and acrylonitrile; or alpha-methyl styrene and acrylonitrile; or styrene, alpha-methyl styrene, and acrylonitrile.

8. The multilayer article of claim 1, wherein said thermoplastic phase further comprises structural units derived from at least one ($C_1$-$C_{12}$)alkyl- or aryl-(meth)acrylate monomer.

9. The multilayer article of claim 8, wherein the rigid thermoplastic phase comprises structural units derived from styrene, acrylonitrile, and methyl methacrylate; or alpha-methyl styrene, acrylonitrile and methyl methacrylate; or styrene, alpha-methyl styrene, acrylonitrile and methyl methacrylate.

10. The multilayer article of claim 8, wherein the wt./wt. ratio of styrene, alpha-methyl styrene or mixture thereof to acrylonitrile is in a range of between about 1.5:1 and about 4:1.

11. The multilayer article of claim 8, wherein the wt./wt. ratio of methyl methacrylate to the total of vinyl aromatic monomer and monoethylenically unsaturated nitrile monomer is in a range of between about 3:1 and about 1:5.

12. The multilayer article of claim 1, wherein at least a portion of rigid thermoplastic phase is prepared in a separate polymerization step and added to the rubber modified thermoplastic resin.

13. The multilayer article of claim 12, wherein the portion of rigid thermoplastic phase prepared in a separate polymerization step comprises structural units derived from styrene and acrylonitrile.

14. The multilayer article of claim 12, wherein the portion of rigid thermoplastic phase prepared in a separate polymerization step comprises structural units derived from styrene, acrylonitrile and methyl methacrylate.

15. The multilayer article of claim 12, wherein the portion of rigid thermoplastic phase prepared in a separate polymerization step is present in an amount of between about 5 wt. % and about 80 wt. % based on the weight of the rubber modified thermoplastic resin.

16. The multilayer article of claim 1, wherein the rheology modifier of the second layer is present, and comprises at least one material selected from the group consisting of (i) acrylic copolymer resins; (ii) resins comprising structural units derived from styrene and acrylonitrile and optionally methyl methacrylate; and (iii) fluoropolymers optionally encapsulated in a resin matrix.

17. The multilayer article of claim 16, wherein the rheology modifier of the second layer is present, and comprises an acrylic copolymer resin comprising structural units derived from methyl methacrylate and about 10-30 weight % butyl acrylate.

18. The multilayer article of claim 1, wherein at least one of the first, second, or third layers further comprises an additive selected from the group consisting of mineral flakes, metallic flakes, colorants, dyes, pigments, lubricants, stabilizers, fillers, crosslinked resinous particles, crosslinked acrylic particles, and mixtures thereof.

19. The multilayer article of claim 1, wherein the third layer comprises ABS in combination with at least one other resinous material selected from the group consisting of poly (vinyl chloride), polycarbonate, bisphenol A polycarbonate, poly(butylene terephthalate), a methyl methacrylate grafted ABS, and an ABS with structural units derived from alpha-methyl styrene in place of styrene.

20. The multilayer article of claim 1, wherein the third layer further comprises recycled material derived from the multilayer article.

21. The multilayer article of claim 1, wherein the backing layer is present.

22. The multilayer article of claim 1, wherein the backing layer is not present and the thickness of the third layer comprising an ABS resin is in a range of between about 3.8 millimeters to about 12 millimeters.

23. The multilayer article of claim 1, wherein the backing layer is not present, and the third layer is selected from the group consisting of a filled ABS, a glass-filled ABS, a high-heat ABS comprising structural units derived from alpha-methyl styrene, and an ABS blend with a polycarbonate.

24. The multilayer article of claim 1, wherein the second layer has an average light penetration depth of about 0.13 millimeters to about 3.8 millimeters for light of wavelength 400-700 nanometers.

25. The multilayer article of claim 1, wherein the second layer is a composite further comprising at least one additional layer comprising a polymer with structural units derived from methyl methacrylate, and optionally a methyl methacrylate-grafted poly(butyl acrylate) impact modifier.

26. The multilayer article of claim 1, wherein the components of the second layer, either individually or in combination, are dried to a volatiles content of less than 0.03 weight % prior to processing a mixture comprising said components to form said second layer.

27. The multilayer article of claim 1, wherein a mixture of the components of the second layer is dried at a temperature above the glass transition temperature of the majority resinous component in said mixture.

28. The multilayer article of claim 1, wherein a mixture of the components of the second layer is dried at a temperature above the glass transition temperature of the resinous component with the highest glass transition temperature in said mixture.

29. The multilayer article of claim 1, wherein the second and third layers are coextruded, and the surface of the second layer is melt-polished before application of the first layer to said surface.

30. The multilayer article of claim 1, wherein the multilayer article is further processed by at least one step of thermoforming, surface decoration, surface etching, painting, baking in a paint oven, in-mold decoration, embossing, or stamping.

31. A multilayer article, which comprises in sequence:
 (i) a first layer comprising an acrylic resin having a thickness in a range of between about 0.007 millimeters and about 3 millimeters;
 (ii) at least one translucent second layer having a thickness in a range of between about 0.5 millimeters and about 5 millimeters and comprising (a) an acrylic resin present in an amount in a range of between about 95 phr and about 50 phr, and optionally further comprising an impact modifier; (b) a rubber modified thermoplastic resin composition present in an amount in a range of between about 5 phr and about 50 phr and comprising a discontinuous elastomeric phase dispersed in a rigid thermoplastic phase, wherein at least a portion of the rigid thermoplastic phase is grafted to the elastomeric phase, wherein said thermoplastic phase comprises structural units derived from at least one vinyl aromatic monomer and at least one monoethylenically unsaturated nitrile monomer; and (c) a visual effects additive present in an amount in a range of between about 1 weight % and about 65 weight % and selected from the group consisting of pigments, glass-based pigments, fillers, mineral flakes, mineral fibers, mica, aluminum flakes, cellulosic flakes, cellulosic fibers, and crosslinked resinous particles having particle size in the range of 0.15 to 3 millimeters, wherein phr values are based on the resinous components of the second layer and weight % values are based on the weight of the entire second layer;

(iii) a third layer directly contacting said second layer comprising an acrylonitrile-butadiene-styrene (ABS) resin, said layer having an impact resistance greater than 350 Newtons per meter according to ASTM D256, and having a thickness either in a range of between about 2 millimeters and about 3.8 millimeters or in a range of between about 3.8 millimeters and about 12 millimeters.

32. The multilayer article of claim 31, wherein the second and third layers are coextruded, and the surface of the second layer is melt-polished before application of the first layer to said surface.

33. The multilayer article of claim 31, wherein the multilayer article is further processed by at least one step of thermoforming, surface decoration, surface etching, painting, baking in a paint oven, in-mold decoration, embossing, or stamping.

* * * * *